US008390613B2

(12) United States Patent
Park et al.

(10) Patent No.: US 8,390,613 B2
(45) Date of Patent: Mar. 5, 2013

(54) DISPLAY DRIVER INTEGRATED CIRCUITS, AND SYSTEMS AND METHODS USING DISPLAY DRIVER INTEGRATED CIRCUITS

(75) Inventors: Chang-wook Park, Suwon-si (KR); Jae-goo Lee, Yongin-si (KR); Seung-gun Lee, Hwaseong-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 176 days.

(21) Appl. No.: 12/662,996

(22) Filed: May 14, 2010

(65) Prior Publication Data

US 2011/0115781 A1 May 19, 2011

(30) Foreign Application Priority Data

Nov. 18, 2009 (KR) ........................ 10-2009-0111545

(51) Int. Cl.
*G09G 5/00* (2006.01)
*G06F 3/038* (2006.01)

(52) U.S. Cl. .......................................... 345/213; 345/99

(58) Field of Classification Search .................. 345/213, 345/87–104, 204, 690
See application file for complete search history.

(56) References Cited

U.S. PATENT DOCUMENTS

| | | | | |
|---|---|---|---|---|
| 6,791,538 | B2 * | 9/2004 | Van Vugt | 345/204 |
| 2003/0030607 | A1 * | 2/2003 | Kitagawa et al. | 345/87 |
| 2004/0036669 | A1 * | 2/2004 | Yanagi et al. | 345/98 |
| 2005/0093808 | A1 * | 5/2005 | Kang et al. | 345/99 |
| 2005/0110732 | A1 * | 5/2005 | Kim | 345/87 |

FOREIGN PATENT DOCUMENTS

| | | |
|---|---|---|
| JP | 2002-082659 | 3/2002 |
| KR | 10-2000-0018587 | 4/2000 |
| KR | 10-2008-0046980 | 5/2008 |

* cited by examiner

*Primary Examiner* — Stephen Sherman
(74) *Attorney, Agent, or Firm* — Harness, Dickey & Pierce, P.L.C.

(57) ABSTRACT

Example embodiments include display driver systems having a host with an external image signal receiving unit configured to receive an external image signal and a graphic control unit configured to transmit input control signals. The systems further include a display driver integrated circuit configured to receive the input control signals, generate a screen display sync signal by using a main clock signal when the external image signal includes a moving image, and generate a screen display sync signal by using an internal clock signal when the external image signal includes a still image, the display driver integrated circuit including. Such circuits have a display driver integrated circuit control unit configured to generate a data control signal, a gradation voltage generating unit configured to generate a gradation voltage and transmit the gradation voltage, and a data driver configured to receive the gradation voltage from the gradation voltage generating unit and apply the gradation voltage to data display signal lines of an LCD panel.

19 Claims, 6 Drawing Sheets

DISPLAY DRIVER INTEGRATED CIRCUITS, AND SYSTEMS AND METHODS USING DISPLAY DRIVER INTEGRATED CIRCUITS

CROSS-REFERENCE TO RELATED APPLICATIONS

This application claims the benefit of Korean Patent Application No. 10-2009-0111545, filed on Nov. 18, 2009, in the Korean Intellectual Property Office (KIPO), the entire disclosure of which is incorporated herein in by reference.

BACKGROUND

Inventive concepts of example embodiments relate to a display driver integrated circuit and systems and methods using the same. Example embodiments may include, for example, a display driver integrated circuits, systems, and methods that vary a driving scheme according to whether an external image signal is a moving image or a still image.

In general, a host using an RGB interface always applies a screen display sync signal to a display driver integrated circuit in order to obtain a synchronized screen display. A host for a conventional display driver system may consume more power when the host continuously applies a screen display sync signal having a higher frequency to a display driver integrated circuit according to a frame frequency. As display driver system resolution increases, the host may require additional resources to control the display driver integrated circuit. Because the host may continuously apply a screen display sync signal having a higher frequency to the display driver integrated circuit, the host may have increased difficulty controlling the display driver integrated circuit.

SUMMARY

Example embodiments may include a host and display driver integrated circuit providing image signals for displaying content on an LCD screen or other output device. The host may include an external image signal receiving unit configured to receive an external image signal and a graphic control unit configured to transmit input control signals. The display driver integrated circuit may be configured to receive the input control signals, configured to generate a screen display sync signal by using a main clock signal when the external image signal includes a moving image, and configured to generate a screen display sync signal by using an internal clock signal when the external image signal includes a still image. The display driver integrated circuit may include a display driver integrated circuit control unit configured to generate a data control signal, a gradation voltage generating unit configured to generate a gradation voltage and transmit the gradation voltage, and a data driver configured to receive the gradation voltage from the gradation voltage generating unit and apply the gradation voltage to data display signal lines of the LCD panel or other output device.

When the external image signal changes from a moving image to a still image, the host may transmit a cut-off command signal of input control signals to the display driver integrated circuit, the display driver integrated circuit may generate an internal clock signal, the display driver integrated circuit may change the screen display sync signal from the main clock signal that is provided by the host to the internal clock signal that is generated by the display driver integrated circuit, and the host may cut off the input control signals.

When the external image signal changes from a still image to a moving image, the host may transmit an apply command signal of input control signals to the display driver integrated circuit, the host may apply the input control signals to the display driver integrated circuit, the display driver integrated circuit may change the screen display sync signal from the internal clock signal that is generated by the display driver integrated circuit to the main clock signal that is provided by the host, and the display driver integrated circuit may stop generating the internal clock signal.

Example methods include generating, with a display driver, a screen display sync signal by using a main clock signal when a received image in an external image signal is a moving image, and generating the screen display sync signal by using an internal clock signal when the received image in the external image signal is a still image.

BRIEF DESCRIPTION OF THE DRAWINGS

Example embodiments will be more clearly understood from the following detailed description taken in conjunction with the accompanying drawings in which.

DETAILED DESCRIPTION

Figure 1:
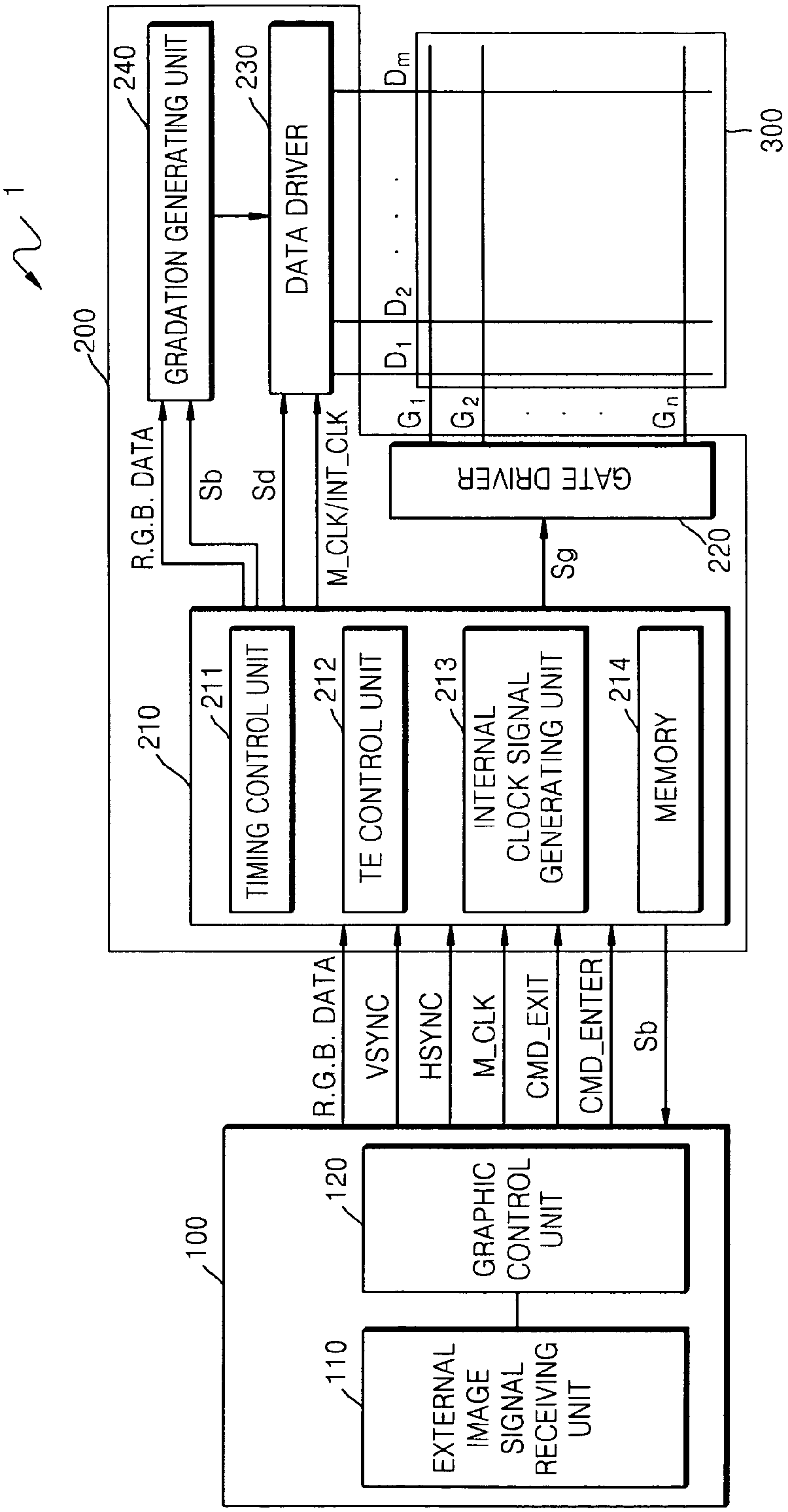
FIG. 1 is a block diagram of an example embodiment display driver system.

Detailed illustrative embodiments of example embodiments are disclosed herein. However, specific structural and functional details disclosed herein are merely representative for purposes of describing example embodiments. The example embodiments may, however, be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

As used herein, the singular forms "a", "an" and "the" are intended to include the plural forms as well, unless the language explicitly indicates otherwise. It will be further understood that the terms "comprises", "comprising,", "includes"

and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures or described in the specification. For example, two figures or steps shown in succession may in fact be executed substantially and concurrently or may sometimes be executed in the reverse order or repetitively, depending upon the functionality/acts involved.

Example embodiments will now be described with reference to the accompanying drawings, in which example embodiments of inventive concepts are shown. Like reference numerals in the drawings denote like elements.

FIG. 1 is a block diagram of an example embodiment display driver system 1. As shown in FIG. 1, the display driver system 1 includes a host 100, a display driver integrated circuit (DDI) 200, and a liquid crystal display (LCD) panel 300.

The host 100 includes an external image signal receiving unit 110 for receiving an external image signal, and a graphic control unit 120 connected to the external image signal receiving unit 110. The graphic control unit 120 changes the external image signal received from the external image signal receiving unit 110 to R.G.B. DATA. The graphic control unit transmits a signal of input data R.G.B. DATA, a vertical sync signal VSYNC, a horizontal sync signal HSYNC, and a main clock signal M_CLK, which are various input control signals, to the DDI 200.

The DDI 200 includes a DDI control unit 210 for controlling the function of the DDI 200, a gate driver 220, a data driver 230, and a gradation voltage generating unit 240. The DDI control unit 210 processes the input R.G.B. DATA to be suitable for operating conditions of the LCD panel 300 based on the vertical sync signal VSYNC, the horizontal sync signal HSYNC, and the main clock signal M_CLK received from the graphic control unit 120. Based on the received signals, the DDI control unit 210 generates a gate control signal Sg and a data control signal Sd, transmits the gate control signal Sg to the gate driver 220, transmits the data control signal Sd to the data driver 230, and transmits the signal of input data R.G.B. DATA to the gradation voltage generating unit 240.

The gate driver 220 turns on switching elements (not shown) respectively connected to gate display signal lines $G_1$ through $G_n$ by applying a gate-on voltage to the gate display signal lines $G_1$ through $G_n$ in response to the gate control signal Sg received from the DDI control unit 210.

The gradation voltage generating unit 240 generates a gradation voltage having a magnitude corresponding to the input data R.G.B. DATA and applies the gradation voltage to the data driver 230.

In response to the data control signal Sd received from the DDI control unit 210, the data driver 230 selects a gradation voltage generated by the gradation voltage generating unit 240 and applies the gradation voltage to data display signal lines $D_1$ through $D_m$.

The LCD panel 300 is connected to the gate display signal lines $G_1$ through $G_n$ and the data display signal lines $D_1$ through $D_m$, and includes a plurality of pixel circuits arranged in rows and columns. The gate display signal lines $G_1$ through $G_n$ transmit a gate signal and the data display signal lines $D_1$ through $D_m$ transmit a data signal. The gate display signal lines $G_1$ through $G_n$ extend substantially parallel to one another in a row direction, and the data display signal lines $D_1$ through $D_m$ extend substantially parallel to one another in a column direction.

A screen display sync signal may be used to display an external image signal on the LCD panel 300. In general, a DDI control unit receives a main clock signal provided by a graphic control unit and uses the main clock signal as a screen display sync signal.

According to the display driver system 1 of FIG. 1, the DDI control unit 210 generates a screen display sync signal by using a main clock signal M_CLK provided by the host 100 when a signal received by the external image signal receiving unit 110 is a moving image. The DDI control unit 210 generates a screen display sync signal by using an internal clock signal INT_CLK generated by the DDI control unit 210 when a signal received by the external image signal receiving unit 110 is a still image.

The DDI control unit 210 includes a timing control unit 211, a tearing effect (TE) control unit 212, an internal clock signal generating unit 213, and a memory 214.

If a frame frequency of an image and a frequency of input data are not the same, TE, which is a condition in which two or more types of data are displayed on one screen, occurs. Due to the TE, two or more frames are separately displayed on one screen, and one of the red (R), green (G), and blue (B) colors is assigned to a next frame to display a different color, thereby resulting in point noise.

In order to detect such TE, the DDI control unit 210 includes the timing control unit 211.

The timing control unit 211 stores or outputs the signal of input data R.G.B. DATA in units of frames. TE is detected by comparing later image data, e.g., $N+1^{th}$ R.G.B. DATA, where N is an image frame or address, for example, newly written to the timing control unit 211 with earlier image data, e.g., $N^{th}$ R.G.B. DATA, previously stored in the timing control unit 211.

The DDI control unit 210 includes the TE control unit 212. When the timing control unit 211 detects TE, the TE control unit 212 prevents noise from being displayed on a screen by applying a cut-off signal Sb to the gradation voltage generating unit 240, so that the gradation voltage generating unit 240 stops outputting gradation voltage.

The DDI control unit 210 includes the internal clock signal generating unit 213. When a signal received by the external image signal receiving unit 110 is a still image, the internal clock signal generating unit 213 generates an internal clock signal INT_CLK, and the DDI control unit 210 transmits the internal clock signal INT_CLK to the data driver 230 and generate a screen display sync signal using the internal clock signal INT_CLK.

When a signal received by the external image signal receiving unit 110 is a still image, the memory 214 stores information about the still image, and the DDI control unit 210 transmits the information about the still image, which is stored in the memory 214, to the gradation voltage generating unit 240.

Figure 2:
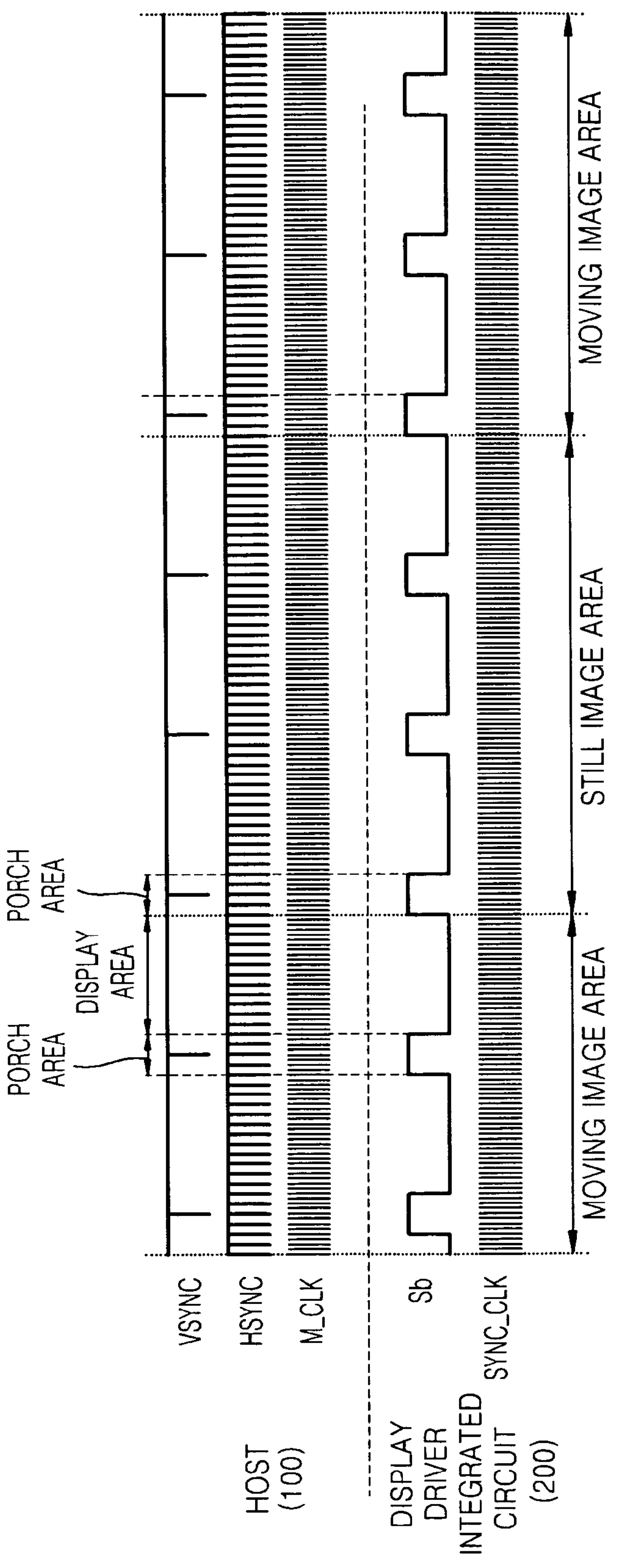
FIG. 2 illustrates waveforms of various signals used in example embodiment display driver systems.
Figure 3:
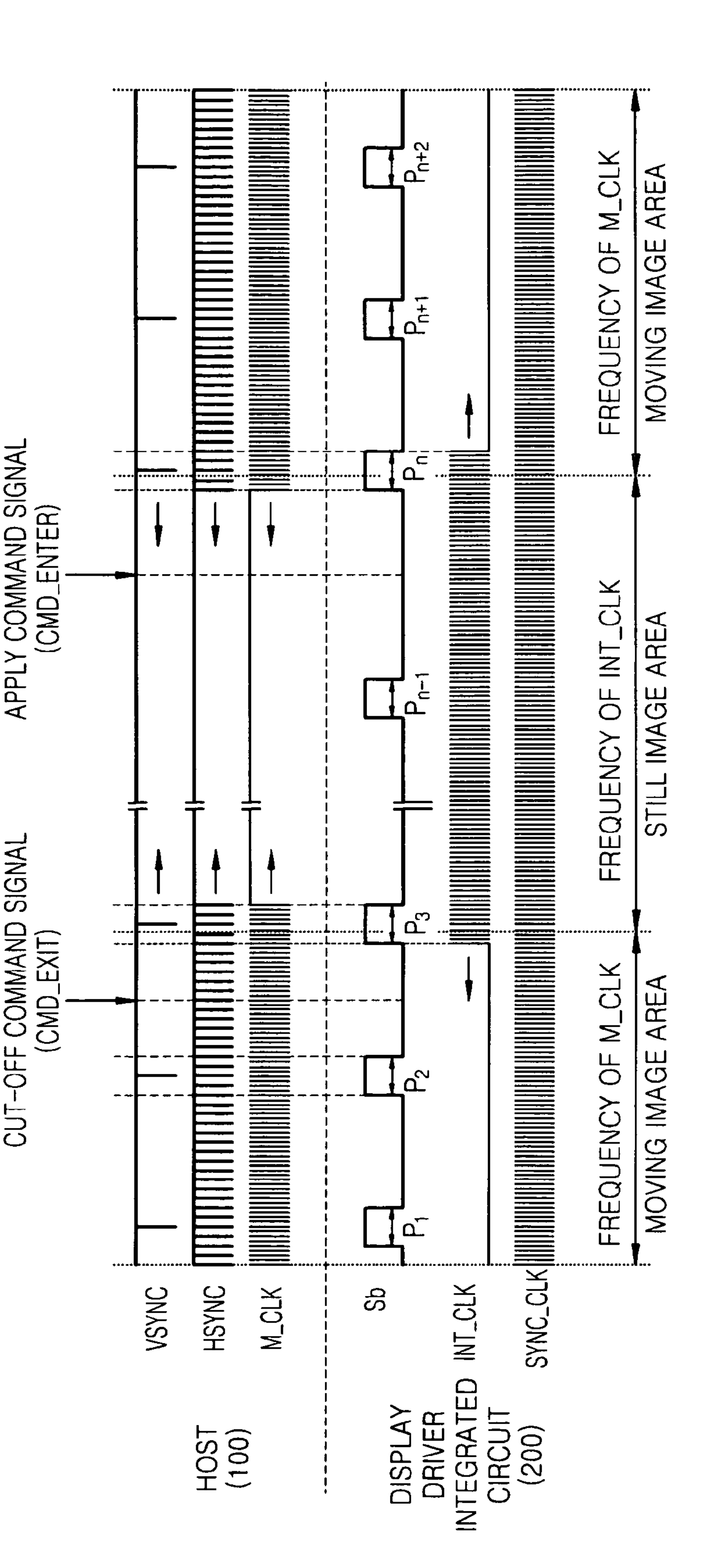
FIG. 3 illustrates waveforms of various signals used in the display example embodiment systems.

This will be further explained with reference to FIGS. 1, 2, and 3. FIG. 2 illustrates waveforms of various signals used in the display driver system 1 of FIG. 1. FIG. 3 illustrates waveforms of various signals used in the display driver system 1 of FIG. 1.

As shown in FIG. 2, the host 100 transmits a vertical sync signal VSYNC, a horizontal sync signal HSYNC, and a main clock signal M_CLK, which are input control signals to the DDI 200. The DDI 200 generates a screen display sync signal SYNC_CLK by using the main clock signal M_CLK.

When the timing control unit 211 detects TE, the TE control unit 212 included in the DDI 200 applies a cut-off signal Sb for cutting off a gradation voltage so that an image including TE is not displayed on the LCD panel 300. As a result, when TE is detected, the image is not displayed on the LCD panel 300, and when TE is not detected, the image is displayed on the LCD panel 300.

A cut-off signal Sb may be present, or have a higher waveform, in a porch area of a video signal, where an image from the signal is not displayed on the LCD panel 300. Remaining portions of the video signal including image data to be displayed may lack a cut-off signal Sb.

Host 100 may consume increased power both when a signal received by the external image signal receiving unit 110 of the host 100 is a moving image and when a signal received by the external image signal receiving unit 110 of the host 100 is a still image, because the host 100 transmits a vertical sync signal VSYNC, a horizontal sync signal HSYNC, and a main clock signal M_CLK, which are input control signals to the DDI 200.

FIG. 3 illustrates how a screen display sync signal is generated in response to a cut-off signal Sb in order to reduce or prevent such increased power consumption, which will be explained in detail.

The operation of the display driver system 1 when an external input signal changes from a moving image to a still image will now be explained below.

When an external image signal is a moving image, the graphic control unit 120 of the host 100 transmits a vertical sync signal VSYNC, a horizontal sync signal HSYNC, and a main clock signal M_CLK, which are input control signals to the DDI control unit 210. When the external image signal changes from the moving image to a still image, the graphic control unit 120 of the host 100 transmits to the DDI control unit 210 a cut-off command signal CMD_EXIT indicating that the vertical sync signal VSYNC, the horizontal sync signal HSYNC, and the main clock signal M_CLK will not be transmitted to the DDI control unit 210.

When the cut-off command signal CMD_EXIT is received, the DDI control unit 210 controls the internal clock signal generating unit 213 to generate an internal clock signal INT_CLK. The DDI control unit 210 changes the screen display sync signal SYNC_CLK from the main clock signal M_CLK provided by the host 100 to the internal clock signal INT_CLK generated by the internal clock signal generating unit 213, and the host 100 cuts off the input control signals VSYNC, HSYNC, and/or M_CLK.

When the screen display sync signal SYNC_CLK changes from the main clock signal M_CLK to the internal clock signal INT_CLK, no image data in the video signal may be displayed on the LCD panel 300. The screen display sync signal SYNC_CLK may change from the main clock signal M_CLK to the internal clock signal INT_CLK in a porch area during this time, when TE control unit 212 causes the image not to be displayed on the LCD panel 300 because TE is detected.

Frequencies of the main clock signal M_CLK and the internal clock signal INT_CLK may be the same. If frequencies of the main clock signal M_CLK and the internal clock signal INT_CLK are different, in order to avoid display abnormalities due to this difference, when the screen display sync signal SYNC_CLK changes from the main clock signal M_CLK to the internal clock signal INT_CLK, the screen display sync signal SYNC_CLK may change from the main clock signal M_CLK to the internal clock signal INT_CLK in the porch area.

To change the screen display sync signal SYNC_CLK from the main clock signal M_CLK to the internal clock signal INT_CLK in the porch area, the cut-off command signal CMD_EXIT may be transmitted in a signal portion including image data displayed on the LCD panel 300.

For example, in FIG. 3, cut-off signal Sb may be present, or have a higher magnitude waveform, in porch areas $P_1$, $P_2$, $P_3$, . . . $P_n$. As shown in FIG. 3, a screen display sync signal SYNC_CLK changes from a main clock signal M_CLK to an internal clock signal INT_CLK in the porch area $P_3$. A cut-off command signal CMD_EXIT is transmitted in a display area between the porch area $P_2$ and the porch area $P_3$.

The internal clock signal generating unit 213 may generate the internal clock signal INT_CLK after the cut-off command signal CMD_EXIT is received, before a porch area not including video data to be displayed on the LCD panel 300. Internal clock signal INT_CLK may be generated before the porch area $P_3$ in FIG. 3. Because the screen display sync signal SYNC_CLK changes to the internal clock signal INT_CLK in the porch area $P_3$, the internal clock signal INT_CLK may be generated before the switch in porch area $P_3$.

Input control signals VSYNC, HSYNC, and M_CLK may not be cut off when the host 100 transmits the cut-off command signal CMD_EXIT to the DDI 200, but may be cut off after the screen display sync signal SYNC_CLK changes from the main clock signal M_CLK to the internal clock signal INT_CLK. When the DDI control unit 210 changes the screen display sync signal SYNC_CLK from the main clock signal M_CLK to the internal clock signal INT_CLK, the host may have been transmitting the input control signals VSYNC, HSYNC, and M_CLK to the DDI control unit, but may stop this transmitting when the clocks change.

TE control unit 212 (FIG. 1) substantially simultaneously transmits a cut-off signal Sb to the gradation voltage generating unit 240 and to the graphic control unit 120 of the host 100. After transmitting the cut-off command signal CMD_EXIT, the graphic control unit 120 of the host 100 may receive the cut-off signal Sb from the TE control unit 212, so that the input control signals VSYNC, HSYNC, and M_CLK are applied until a porch area after the transmission of the cut off command signal CMD_EXIT ends, and input control signals VSYNC, HSYNC, and M_CLK are cut off when the first porch area ends.

As shown in FIG. 3; the graphic control unit 120 of the host 100 may transmit the input control signals VSYNC, HSYNC, and M_CLK to the DDI control unit 200 until the porch area P3 ends, and when the porch area P3 ends, input control signals VSYNC, HSYNC, and M_CLK are cut off. Because the screen display sync signal SYNC_CLK changes to the internal clock signal INT_CLK at a time in the porch area P3, the input control signals VSYNC, HSYNC, and M_CLK may be applied until the porch area P3 ends.

Next, the operation of the display driver system 1 when an external input signal changes from a still image to a moving image will now be explained.

When an external image signal is a still image, a screen display sync signal SYNC_CLK is generated by using an internal clock signal INT_CLK generated by the internal clock signal generating unit 213. When the external image signal changes from the still image to a moving image, the graphic control unit 120 of the host 100 transmits an apply command signal CMD_ENTER indicating that a vertical sync signal VSYNC, a horizontal sync signal HSYNC, and a main clock signal M_CLK, which are input control signals, will be transmitted to the DDI control unit 210. The graphic control unit 120 of the host 100 applies the input control signals VSYNC, HSYNC, and M_CLK to the DDI control unit 210, and the DDI control unit 210 changes the screen display sync signal SYNC_CLK from the internal clock signal INT_CLK generated by the internal clock signal generating unit 213 to the main clock signal M_CLK provided by the graphic control unit 120 of the host 100.

When the screen display sync signal SYNC_CLK changes from the internal clock signal INT_CLK to the main clock signal M_CLK, no image data in the video signal may be displayed on the LCD panel 300. The screen display sync signal SYNC_CLK may switch from the internal clock signal INT_CLK to the main clock signal M_CLK in a porch area during this time, when TE control unit 212 causes the image not to be displayed on the LCD panel 300 because TE is detected.

Frequencies of the main clock signal M_CLK and the internal clock signal INT_CLK may be the same. If the frequencies of the main clock signal M_CLK and the internal clock signal INT_CLK are different, in order to avoid display abnormalities due to this difference, when the screen display sync signal SYNC_CLK changes from the internal clock signal INT_CLK to the main clock signal M_CLK, the screen display sync signal SYNC_CLK may change from the internal clock signal INT_CLK to the main clock signal M_CLK in the porch area.

To change the screen display sync signal SYNC_CLK from the internal clock signal INT_CLK to the main clock signal M_CLK in the porch area, the apply command signal CMD_ENTER may be transmitted in a signal portion having image data displayed on the LCD panel 300.

In FIG. 3, cut-off signal Sb may be present, or have a higher magnitude waveform, in porch areas $P_1$, $P_2$, $P_3$, . . . $P_{n+2}$. A screen display sync signal SYNC_CLK changes from an internal clock signal INT_CLK to a main clock signal M_CLK in the porch area $P_n$. An apply command signal CMD_ENTER is transmitted in a display area between the porch area $P_{n-1}$ and the porch area $P_n$.

The graphic control unit 120 of the host 100 may generate input control signals VSYNC, HSYNC, and M_CLK after an apply command signal CMD_ENTER is transmitted and before a porch area not including video data to be displayed on the LCD panel 300. Input control signals VSYNC, HSYNC, and/or M_CLK may be generated before the porch area $P_n$ in FIG. 3. Because the screen display sync signal SYNC_CLK changes to the main clock signal M_CLK in the porch area $P_n$, the main clock signal M_CLK may be generated before the porch area $P_n$.

Referring to FIG. 1, the TE control unit 212 simultaneously transmits a cut-off signal Sb to the gradation voltage generating unit 240 and to the graphic control unit 120 of the host 100. The graphic control unit 120 of the host 100 receives the cut-off signal Sb from the TE control unit 212 after the apply command signal CMD_ENTER is transmitted, so that the input control signals VSYNC, HSYNC, and M_CLK are transmitted until a first porch area after the transmission of the apply command signal CMD_ENTER.

The internal clock signal generating unit 213 may not stop generating the internal clock signal when the apply command signal CMD_ENTER is received from the graphic control unit 120, but may stop generating the internal clock signal INT_CLK after the screen display sync signal SYNC_CLK changes from the internal clock signal INT_CLK to the main clock signal M_CLK. DDI control unit 210 may control the internal clock signal generating unit 213 to continuously generate the internal clock signal INT_CLK until the screen display sync signal SYNC_CLK changes from the internal clock signal INT_CLK to the main clock signal M_CLK. DDI control unit 210 may control the internal clock signal generating unit 213 to stop generating the internal clock signal INT_CLK when the screen display sync signal SYNC_CLK changes from the internal clock signal INT_CLK to the main clock signal M_CLK. The internal clock signal INT_CLK may be generated until the porch area $P_n$ ends in FIG. 3. Because the screen display sync signal SYNC_CLK changes to the main clock signal M_CLK in the porch area $P_n$, the internal clock signal INT_CLK may be generated until the porch area $P_n$ ends.

Example methods of operating a display driver vary depending on whether a type of an image signal received from the host 100 is a still image or a moving image. If an external signal is a moving image, a screen display sync signal SYNC_CLK is generated by using a main clock signal M_CLK provided by the host 100, and if an external signal is a still image, a screen display sync signal SYNC_CLK is generated by using an internal clock signal INT_CLK generated by the DDI 200.

Figure 4:
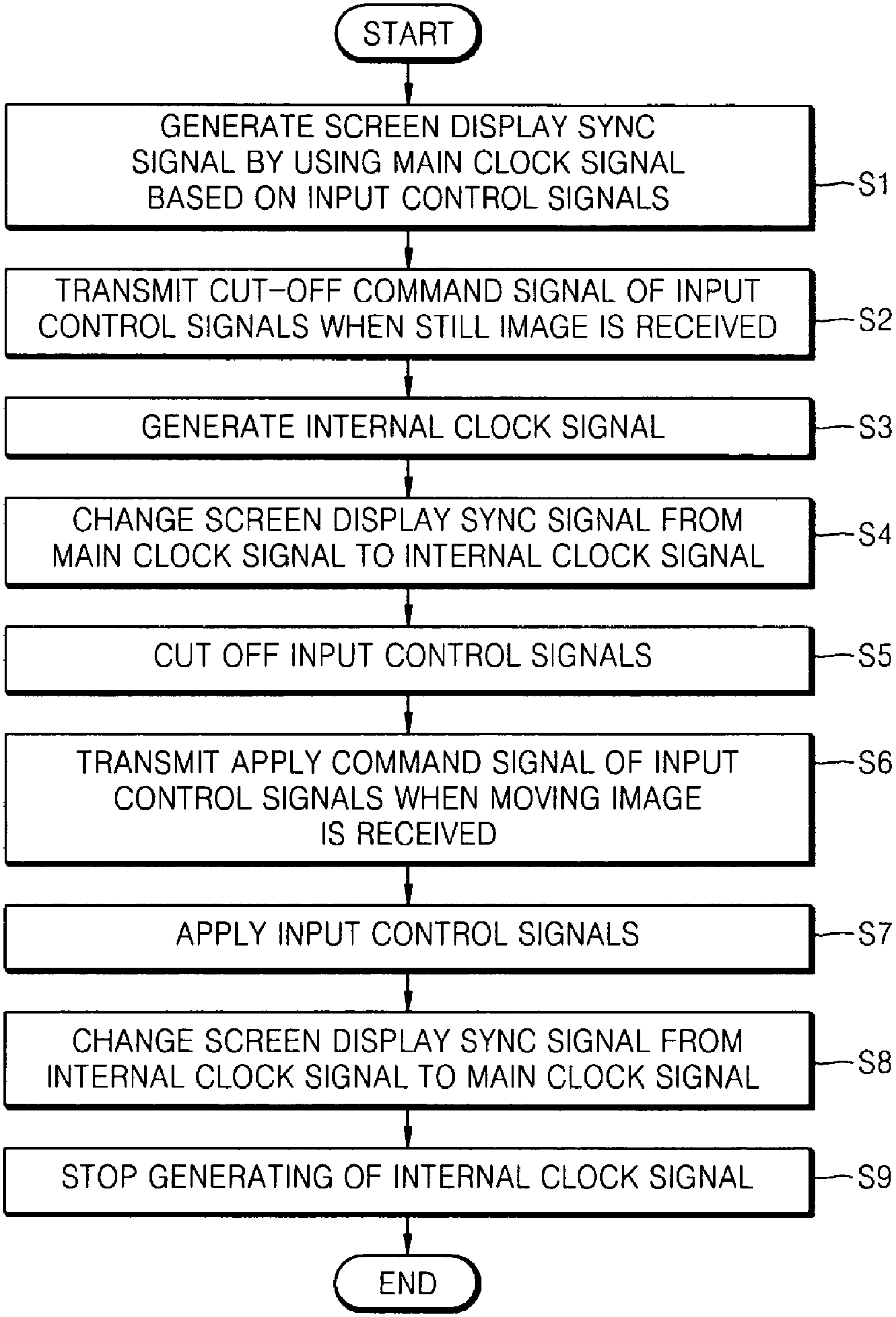
FIG. 4 is a flowchart illustrating an example method of using a display driver.

FIG. 4 is a flowchart illustrating an example method of operating a display driver.

FIG. 4 illustrates a display driver method when an external image signal received by the external image signal receiving unit 110 changes from a moving image to a still image, and then from the still image to a moving image.

In operation S1, when an external image signal is a moving image, the graphic control unit 120 of the host 100 transmits a vertical sync signal VSYNC, a horizontal sync signal HSYNC, and a main clock signal M_CLK, which are input control signals, to the DDI control unit 210, and the DDI control unit 210 generates a screen display sync signal SYNC_CLK by using the main clock signal M_CLK.

In operation S2, when the external image signal changes from the moving image to a still image, the graphic control unit 120 of the host 100 transmits a cut-off command signal CMD_EXIT. In operation S3, the internal clock signal generating unit 213 of the DDI 200 generates an internal clock signal INT_CLK. In operation S4, the DDI control unit 210 changes the screen display sync signal SYNC_CLK from the main clock signal M_CLK provided by the graphic control unit 120 to the internal clock signal INT_CLK generated by the internal clock signal generating unit 213. In operation S5, when the screen display sync signal SYNC_CLK changes to the internal clock signal INT_CLK, the graphic control unit 120 of the host 100 cuts off the input control signals VSYNC, HSYNC, and M_CLK. Accordingly, when a still image is received, the host 100 does not generate and transmit the input control signals VSYNC, HSYNC, and M_CLK to the DDI 200 and the screen display sync signal SYNC_CLK is generated by using the internal clock signal INT_CLK generated by the DDI 200. Host 100 may consume less power in this manner.

When the external image signal changes from the still image to a moving image again, in operation S6, the graphic control unit 120 of the host 100 transmits an apply command signal CMD_ENTER of the input control signals VSYNC, HSYNC, and M_CLK to the DDI control unit 210. In operation S7, the graphic control unit 120 applies the input control signals VSYNC, HSYNC, and M_CLK to the DDI control unit 210. In operation S8, the DDI control unit 210 changes the screen display sync signal SYNC_CLK from the internal clock signal INT_CLK generated by the internal clock signal generating unit 213 to the main clock signal M_CLK provided by the graphic control unit 120 of the host 100. In operation S9, the internal clock signal generating unit 213 stops generating the internal clock signal INT_CLK.

Figure 5:
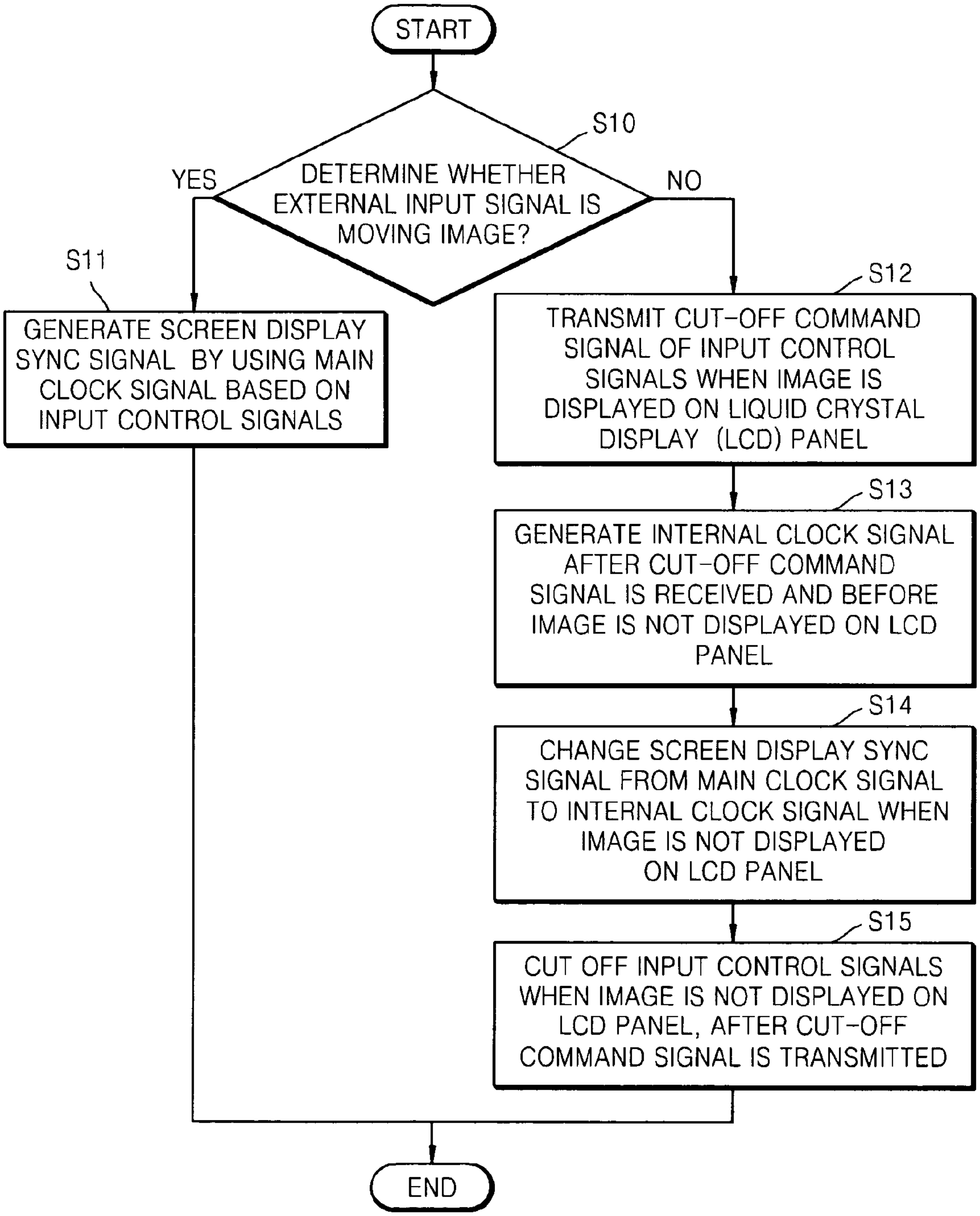
FIG. 5 is a flowchart illustrating another example method of using a display driver when an external input signal changes from a moving image to a still image.

FIG. 5 is a flowchart illustrating an example method of operating a display driver when an external input signal changes from a moving image to a still image.

In operation S10, it is determined whether an image signal received by the external image signal receiving unit 110 is a moving image. If it is determined in operation S10 that the image signal received by the external image signal receiving unit 110 is a moving image, the method proceeds to operation S11. In operation S11, the graphic control unit 120 of the host 100 transmits a vertical sync signal VSYNC, a horizontal sync signal HSYNC, and a main clock signal M_CLK, which are input control signals, to the DDI control unit 210, and the DDI control unit 210 generates a screen display sync signal SYNC_CLK by using the main clock signal M_CLK received by the DDI control unit 210.

Otherwise, if it is determined in operation S10 that the image signal received by the external image signal receiving unit 110 is a still image, the method proceeds to operation S12. In operation S12, the graphic control unit 120 of the host 100 transmits a cut-off command signal CMD_EXIT of the input control signals VSYNC, HSYNC, and M_CLK to the DDI control unit 210. In order to change the screen display sync signal SYNC_CLK from the main clock signal M_CLK to the internal clock signal INT_CLK in a porch area, the cut-off command signal CMD_EXIT may be transmitted in a when an image is displayed on the LCD panel 300.

In operation S13, when the cut-off command signal CMD_EXIT is received, the DDI control unit 210 controls the internal clock signal generating unit 213 to generate an internal clock signal INT_CLK. The internal clock signal generating unit 213 may generate the internal clock signal INT_CLK after the cut-off command signal CMD_EXIT is received and before a porch area when no image is displayed on the LCD panel 300.

In operation S14, the DDI control unit 210 changes the screen display sync signal SYNC_CLK from the main clock signal M_CLK provided by the graphic control unit 120 to the internal clock signal INT_CLK generated by the internal clock signal generating unit 213. When the screen display sync signal SYNC_CLK changes from the main clock signal M_CLK to the internal clock signal INT_CLK, an image is not displayed on the LCD panel 300. The screen display sync signal SYNC_CLK may change from the main clock signal M_CLK to the internal clock signal INT_CLK in a porch area where an image is not to be displayed on the LCD panel 300 because TE is detected.

Frequencies of the main clock signal M_CLK and the internal clock signal INT_CLK may be substantially the same. If the frequencies of the main clock signal M_CLK and the internal clock signal INT_CLK are different, display abnormalities may occur due to this difference. The screen display sync signal SYNC_CLK may change from the main clock signal M_CLK to the internal clock signal INT_CLK in the porch area in order to avoid or reduce these abnormalities.

In operation S15, when the screen display sync signal SYNC_CLK changes to the internal clock signal INT_CLK, the graphic control unit 120 of the host 100 cuts off the input control signals VSYNC, HSYNC, and M_CLK. The input control signals VSYNC, HSYNC, and M_CLK may not be cut off as soon as the host 100 transmits the cut-off command signal CMD_EXIT, but may be cut off after the screen display sync signal SYNC_CLK changes from the main clock signal M_CLK to the internal clock signal INT_CLK. After the cut off command signal CMD_EXIT is transmitted, the graphic control unit 120 of the host 100 receives a cut-off signal Sb from the TE control unit 212, so that the input control signals VSYNC, HSYNC, and M_CLK are applied until a porch area after the transmission of the cut-off command signal CMD_EXIT, and the input control signals VSYNC, HSYNC, and M_CLK are cut off when the first porch area ends.

Figure 6:
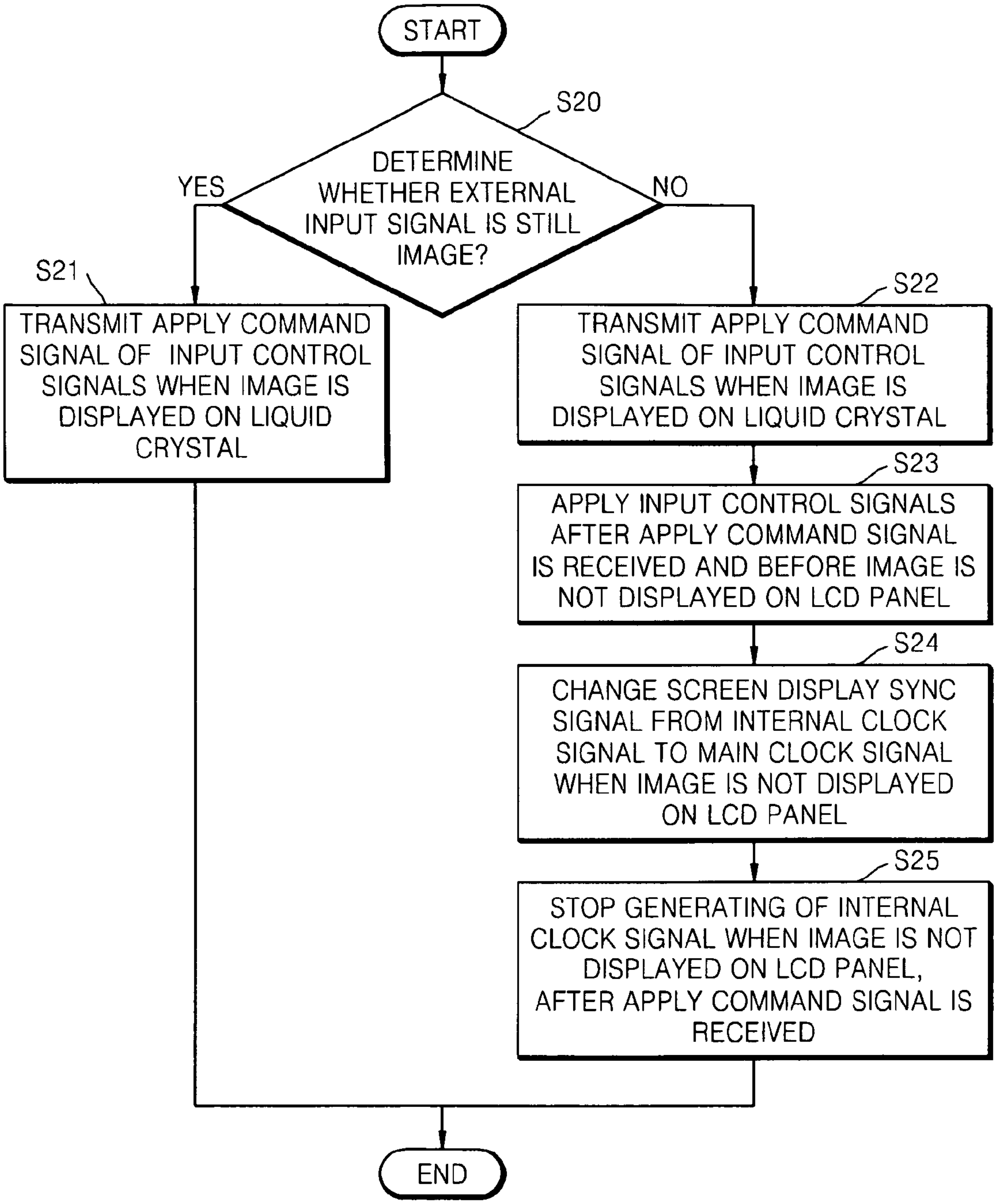
FIG. 6 is a flowchart illustrating another example method of using a display driver when an external input signal changes from a still image to a moving image.

FIG. 6 is a flowchart illustrating an example method of operating a display driver when an external input signal changes from a still image to a moving image.

In operation S20, it is determined whether an image signal received by the external image signal receiving unit 110 is a still image. If it is determined in operation S20 that the image signal received by the external image signal receiving unit 110 is a still image, the method proceeds to operation S21. In operation S21, a screen display sync signal SYNC_CL is generated by using an internal clock signal INT_CLK generated by the internal clock signal generating unit 213.

If it is determined in operation S20 that the image signal received by the external image signal receiving unit 110 is a moving image, the method proceeds to operation S22. In operation S22, the graphic control unit 120 of the host 100 transmits an apply command signal CMD_ENTER of input control signals VSYNC, HSYNC, and M_CLK to the DDI control unit 210. In order to change the screen display sync signal SYNC_CLK from the internal clock signal INT_CLK to a main clock signal M_CLK in a porch area, the apply command signal may be transmitted when an image is displayed on the LCD panel 300.

In operation S23, the graphic control unit 120 applies the input control signals VSYNC, HSYNC, and M_CLK to the DDI control unit 210. The graphic control unit 120 of the host 100 may generate the input control signals VSYNC, HSYNC, and M_CLK after the apply command signal CMD_ENTER is transmitted and before a porch area not including image data to be displayed on the LCD panel 300. After the apply command signal CMD_ENTER is transmitted, the graphic control unit 120 of the host 100 receives a cut-off signal Sb from the TE control unit 212, so that the input control signals VSYNC, HSYNC, and M_CLK can be generated until a first porch area coming after the transmission of the apply command signal CMD_ENTER starts.

In operation S24, the DDI control unit 210 changes the screen display sync signal SYNC_CLK from the internal clock signal INT_CLK generated by the internal clock signal generating unit 213 to the main clock signal M_CLK provided by the graphic control unit 120 of the host 100. When the screen display sync signal SYNC_CLK changes from the internal clock signal INT_CLK to the main clock signal M_CLK, an image is not displayed on the LCD panel 300. Screen display sync signal SYNC_CLK may change from the internal clock signal INT_CLK to the main clock signal M_CLK in a porch area when the TE control unit 212 causes no image to be displayed on the LCD panel 300 because TE is detected.

Frequencies of the main clock signal M_CLK and the internal clock signal INT_CLK may be substantially the same. If the frequencies of the main clock signal M_CLK and the internal clock signal INT_CLK are different, display abnormalities may occur due to this difference. The screen display sync signal SYNC_CLK may change from the internal clock signal INT_CLK to the main clock signal M_CLK in the porch area to avoid or reduce these abnormalities.

In operation S25, the internal clock signal generating unit 213 stops generating the internal clock signal INT_CLK. The internal clock signal generating unit 213 may not stop generating the internal clock signal INT_CLK when the apply command signal CMD_ENTER is received by the graphic control unit 120, but may stop generating the internal clock signal INT_CLK after the screen display sync signal SYNC_CLK changes from the internal clock signal INT_CLK to the main clock signal M_CLK. DDI control unit 210 may control the internal clock signal generating unit 213 to continuously generate the internal clock signal INT_CLK until the screen display sync signal SYNC_CLK changes from the internal clock signal INT_CLK to the main clock signal M_CLK and control the internal clock signal generating unit 213 to stop generating the internal clock signal INT_CLK when the screen display sync signal SYNC_CLK changes from the internal clock signal INT_CLK to the main clock signal M_CLK.

While inventive concepts have been shown and described with reference to example embodiments and methods using the same, the embodiments and terms should not be construed as limiting the scope of the following claims. Accordingly, it will be understood by those of ordinary skill in the art that various changes in form and details may be made therein without departing from the spirit and scope of the following claims.

What is claimed is:

1. A display driver integrated circuit comprising:

a display driver integrated circuit control unit configured to generate a screen display sync signal by using a main clock signal from an external source when an external image is a moving image, and configured to generate a screen display sync signal by using an internal clock signal when the external image is a still image, and wherein, if the external image changes from the moving image to the still image, a cut-off command signal is received and then at a time when an image is not displayed, in response to a cut-off signal generated after receiving the cut-off command signal, the screen display sync signal is changed from the main clock signal to the internal clock signal and the main clock signal is cut off, and if the external image changes from the still image to the moving image, an apply command signal and the main clock signal is received and then at a time when an image is not displayed, in response to a cut-off signal generated after receiving the apply command signal, the screen display sync signal is changed from the internal clock signal to the main clock signal and generating of the internal clock signal is stopped.

2. The display driver integrated circuit of claim 1, further comprising:

a gradation voltage generating unit configured to generate a gradation voltage and apply the gradation voltage to a data driver; and a data driver configured to select the gradation voltage and apply the gradation voltage to data display signal lines.

3. The display driver integrated circuit of claim 2, wherein the display driver integrated circuit control unit includes, a timing control unit configured to detect a tearing effect by comparing current image data with previously stored image data; and a tearing effect control unit configured to apply a cut-off signal to the gradation voltage generating unit when the timing control unit detects the tearing effect, the gradation voltage generating unit configured to terminate the gradation voltage when the cut-off signal is received.

4. The display driver integrated circuit of claim 3, wherein the screen display sync signal is generated in response to the cut-off signal.

5. The display driver integrated circuit of claim 3, wherein the display driver integrated circuit control unit further includes a memory configured to store the previously stored image data, and wherein the display driver integrated circuit control unit is configured to transmit the previously stored image data to the gradation voltage generating unit.

6. A display driver system comprising:

a host including, an external image signal receiving unit configured to receive an external image signal, and a graphic control unit configured to transmit input control signals; and a display driver integrated circuit configured to receive the input control signals, configured to generate a screen display sync signal by using a main clock signal when the external image signal includes a moving image, and configured to generate a screen display sync signal by using an internal clock signal when the external image signal includes a still image, the display driver integrated circuit including, a display driver integrated circuit control unit configured to generate a data control signal, wherein if the external image changes from the moving image to the still image, a cut-off command signal is received and then at a time when an image is not displayed, in response to a cut-off signal generated after receiving the cut-off command signal, the screen display sync signal is changed from the main clock signal to the internal clock signal and the main clock signal is cut off, and if the external image changes from the still image to the moving image, an apply command signal and the main clock signal is received and then at a time when an image is not displayed, in response to a cut-off signal generated after receiving the apply command signal, the screen display sync signal is changed from the internal clock signal to the main clock signal and generating of the internal clock signal is stopped, a gradation voltage generating unit configured to generate a gradation voltage and transmit the gradation voltage, and a data driver configured to receive the gradation voltage from the gradation voltage generating unit and apply the gradation voltage to data display signal lines of an LCD panel.

7. The display driver system of claim 6, wherein, if an image in the external image signal changes from a moving image to a still image, the host is configured to transmit a cut-off command signal to the display driver integrated circuit, the display driver integrated circuit is configured to generate the internal clock signal, the display driver integrated circuit is configured to change from using the main clock signal to generate the screen display sync signal to using the internal clock signal to generate the screen display sync signal, and the host is configured to stop transmitting the input control signals.

8. The display driver system of claim 6, wherein, if an image in the external image signal changes from a still image to a moving image, the host is configured to transmit an apply command signal to the display driver integrated circuit, and configured to transmit the input control signals to the display driver integrated circuit, the display driver integrated circuit is configured to change from using the internal clock signal to generate the screen display sync signal to using the main clock signal to generate the screen display sync signal, and the display driver integrated circuit is configured to stop generating the internal clock signal.

9. A method of operating a display driver, the method comprising:

generating, with the display driver, a screen display sync signal by using a main clock signal from an external source when a received image in an external image signal is a moving image, generating, with the display driver, the screen display sync signal by using an internal clock signal when the received image in the external image signal is a still image, if the external image changes from the moving image to the still image the method further includes, receiving a cut-off command signal, generating a cut-off signal after receiving the cut-off command signal, changing the screen display sync signal from the main clock signal to the internal clock signal, at a time when an image is not displayed, in response to the cut-off signal, and cutting off the main clock signal, and if the external image changes from the still image to the moving image the method further includes, receiving an apply command signal and the main clock signal, generating a cut-off signal after receiving the apply command signal, changing the screen display sync signal from the internal clock signal to the main clock signal, at a time when an image is not displayed, in response to the cut-off signal, and stopping the generation of the internal clock signal.

10. The method of claim 9, further comprising:

if an image in the external image signal changes from a moving image to a still image, receiving a cut-off command signal from an external host, generating the internal clock signal, changing from using the main clock signal to generate the screen display sync signal to using the internal clock signal to generate the screen display sync signal, and cutting off input control signals from the external host.

11. The method of claim 10, wherein the cut-off command signal is received when the image from the external image signal is displayed.

12. The method of claim 10, wherein the internal clock signal is generated at a time after the cut-off command signal is received and when the image from the external image signal is displayed.

13. The method of claim 10, wherein the changing from using the main clock signal to generate the screen display sync signal to using the internal clock signal to generate the screen display sync signal occurs when the image from the external image signal is not displayed.

14. The method of claim 10, wherein the input control signals are cut off when the image from the external image signal is not displayed, the image from the external image signal being displayed after the input control signals are cut off.

15. The method of claim 9, further comprising:

if an image in the external image signal changes from a still image to a moving image, receiving an apply command signal from an external host, receiving input control signals from the external host, changing from using the internal clock signal to generate the screen display sync signal to using the main clock signal to generate the screen display sync signal, and stopping generating the internal clock signal.

16. The display driver method of claim 15, wherein the apply command signal is received when the image from the external image signal is displayed.

17. The display driver method of claim 15, wherein the input control signals are received after the apply command signal is received and when the image from the external image signal is displayed.

18. The display driver method of claim 15, wherein the changing from using the internal clock signal to generate the screen display sync signal to using the main clock signal to generate the screen display sync signal occurs when the image from the external image signal is not displayed.

19. The display driver method of claim 15, wherein the internal clock signal is stopped when the image from the external image signal is not displayed, the image from the external image signal being displayed after the input control signals are cut off.

* * * * *

UNITED STATES PATENT AND TRADEMARK OFFICE

CERTIFICATE OF CORRECTION

PATENT NO. : 8,390,613 B2
APPLICATION NO. : 12/662996
DATED : March 5, 2013
INVENTOR(S) : Chang-wook Park et al.

It is certified that error appears in the above-identified patent and that said Letters Patent is hereby corrected as shown below:

In the Claims:

At Column 11; Claim 1; Line 24; replace “a” with --the--.

At Column 11; Claim 1; Line 38; replace “is” with --are--.

At Column 12; Claim 6; Line 13; replace “a” with --the--.

At Column 12; Claim 6; Line 28; replace “is” with --are--.

Signed and Sealed this
Fourteenth Day of May, 2013

Teresa Stanek Rea
*Acting Director of the United States Patent and Trademark Office*